Figure 9:
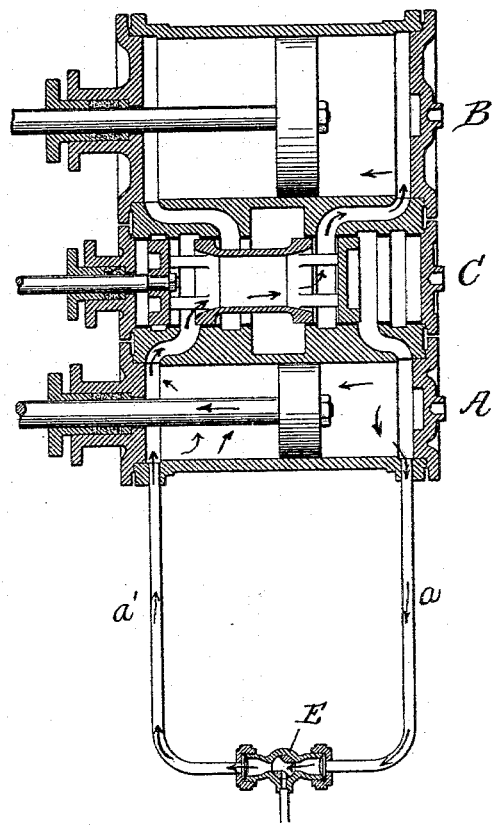

(No Model.) 3 Sheets—Sheet 1.
S. M. VAUCLAIN & K. RUSHTON.
COMBINED STARTING AND DRIP VALVE MECHANISM FOR COMPOUND ENGINES.
No. 515,725. Patented Feb. 27, 1894.
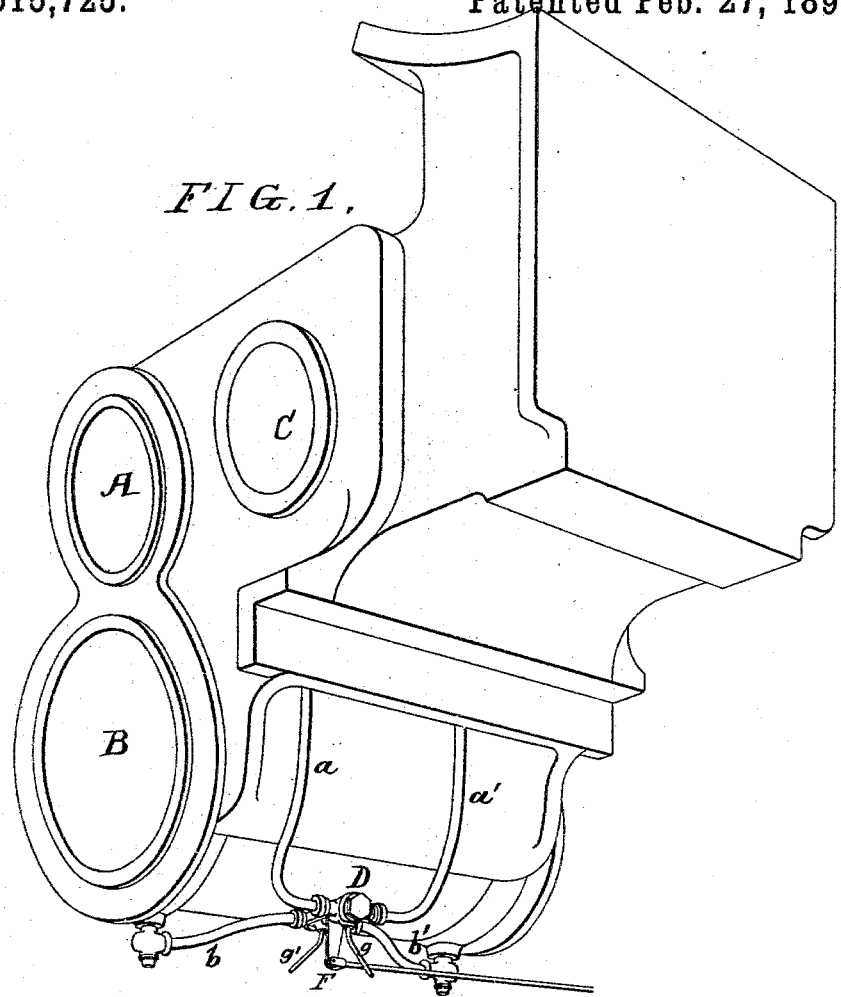
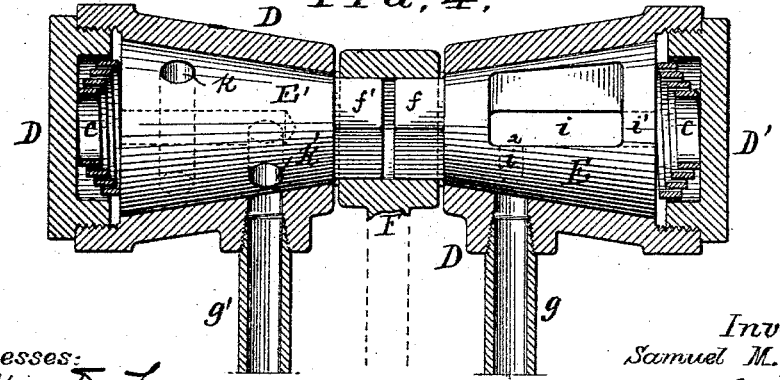
Witnesses:
Inventors:
Samuel M. Vauclain
and
Kenneth Rushton
by their Attorneys

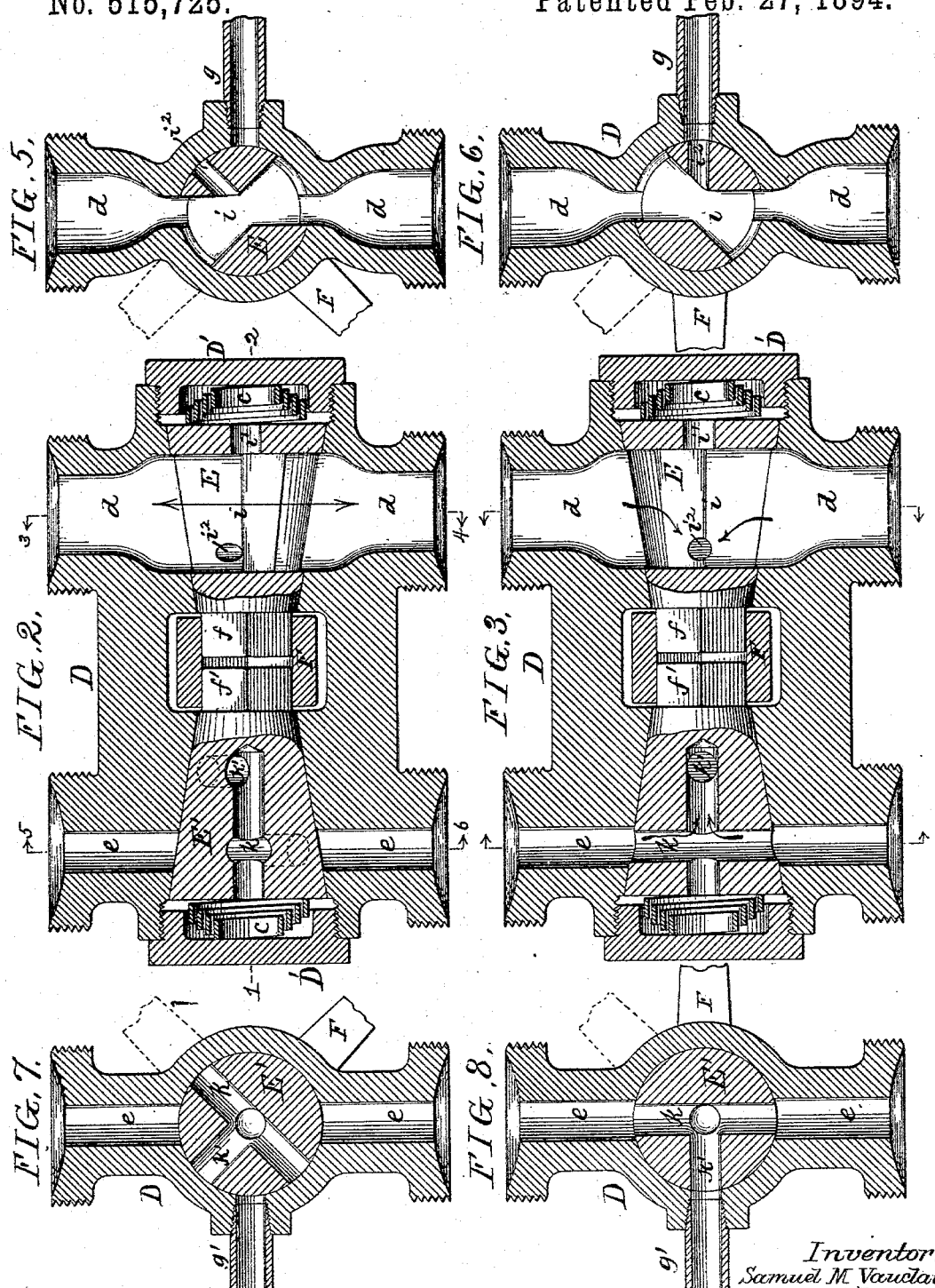

(No Model.) 3 Sheets—Sheet 3.
S. M. VAUCLAIN & K. RUSHTON.
COMBINED STARTING AND DRIP VALVE MECHANISM FOR COMPOUND ENGINES.

No. 515,725. Patented Feb. 27, 1894.

WITNESSES:
Albert Popkins
William M. duPré

INVENTORS:
S. M. Vauclain
K. Rushton
By Howson & Howson
Attys.

UNITED STATES PATENT OFFICE.

SAMUEL M. VAUCLAIN AND KENNETH RUSHTON, OF PHILADELPHIA, PENNSYLVANIA.

COMBINED STARTING AND DRIP VALVE MECHANISM FOR COMPOUND ENGINES.

SPECIFICATION forming part of Letters Patent No. 515,725, dated February 27, 1894.

Application filed September 22, 1893. Serial No. 486,184. (No model.)

*To all whom it may concern:*

Be it known that we, SAMUEL M. VAUCLAIN and KENNETH RUSHTON, both citizens of the United States, and residents of Philadelphia, Pennsylvania, have invented a certain Combined Starting and Drip Valve Mechanism for Compound Engines, of which the following is a specification.

The object of our invention is to combine a starting valve with the cylinder cocks of compound engines in such a manner that a single lever will only be necessary for the proper operation of the parts. This object we attain in the following manner, reference being had to the accompanying drawings, in which—

Figure 1, is a perspective view showing a cylinder casting of a compound locomotive engine, and the starting valve and cylinder cock structure. Fig. 2, is a longitudinal sectional view through the valve casing showing the valves turned so as to form communication between both ends of the high pressure cylinder, and to cut off the drip passages. Fig. 3, is a view similar to Fig. 2, with the exception that the valves are turned so that both ends of the high and low pressure cylinders connect with the drip passages. Fig. 4, is a longitudinal section on the line 1—2, Fig. 2. Fig. 5, is a transverse section on the line 3—4, Fig. 2. Fig. 6, is a view on the same line, showing the valve turned as in Fig. 3. Fig. 7, is a section on the line 5—6, Fig. 2; and Fig. 8, is a similar section showing the valves turned as in Fig. 3. Fig. 9, is a diagrammatic view showing the course of live steam to the low pressure cylinder.

A is the high pressure cylinder.
B is the low pressure cylinder.
C is a valve chest.
D is the combined starting and cylinder cock casing connected to both ends of the high pressure cylinder by pipes $a$, $a'$ and to both ends of the low pressure cylinder by pipes $b$ $b'$, as clearly shown in Fig. 1.

$d$ is the high pressure passage in the casing D, and $e$ is the low pressure passage in said casing.

E E' are tapered valves adapted to tapered seats in the valve casing D, and have, at their small end, squared heads $f, f'$ adapted to a socket in the lever F, which is connected by a rod, or other means, to operating mechanism in the cab of the locomotive. Between the large end of each valve and the removable cap D' is a spring $c$ to keep the valves to their seats. By removing these caps the valves can be drawn out and repaired or cleaned, and readily inserted without detaching other parts of the mechanism. The valve E in the high pressure passage $d$ is a starting valve as well as a drip valve, while the valve E' simply acts as a drip valve, and cuts off communication between the ends of the low pressure cylinder, when the valve E is acting as a starting valve only.

The port $i$ in the valve E, is preferably of the shape shown in Fig. 5, and communicates with the spring chamber through a passage $i'$ in the valve, so that steam can gain access to the chamber and keep the valve to its seat. The passage $i$ also communicates with a passage $i^2$ and when the valve is moved to the position shown in Fig. 6, the passage is in line with $d$ $d$ acting as a starting valve, at the same time $i^2$ is in line with the drip passage so that both ends of the high pressure cylinder communicate with said drip passage; but when the valve is turned to the position shown in Fig. 5, the drip passage is cut off and starting valve only is open. As clearly shown in the diagram, Fig. 9, in either case the live steam passes through the high pressure cylinder, by way of the connecting pipes or passages and starting valve, to the low pressure cylinder, as indicated by the arrows.

The passage in the valve E' is so formed that it will cut off communication between the ends of the low pressure cylinder, as shown in Fig. 7, when the valve E is acting as a starting valve only. When the valve E is acting as a starting valve with high pressure drip passage open Fig. 6, valve E' is in position as shown in Fig. 8, the passage $k$ communicating through the passage $k'$ with the drip passage $g'$ so that both ends of the low pressure cylinder will communicate with said drip, and the two valves E E' are so arranged that when turned in the position indicated in Fig. 3, they both act as drip valves.

It will be readily seen from the above that when the lever is in the center position, the starting valve is operating and cylinder cocks are opened to both ends of the high and low pressure cylinders, and when the lever is in the position shown in Fig. 5, the starting valve is only opened, the drip passages being closed, and also the passage between the ends of the low pressure cylinder, and when the lever is moved to the position shown in dotted lines in Figs. 5, and 7, all the openings are closed.

We claim as our invention—

1. In a compound engine, the high and low pressure cylinders, a valve casing, independent passages communicating respectively with the high and low pressure cylinders, and with drip passages, valves in said casing to open both cylinders to drip, one of said valves being adapted to form a communication between both ends of the high pressure cylinder only, substantially as set forth.

2. The combination in a combined cylinder and starting cock, of the casing, the two valves therein, a handle engaging both valves, passages in said casing, communicating with both ends of the high and low pressure cylinders, and drip passages with ports in the valves, said ports being so formed that when the high pressure valve is used as a starting valve only the low pressure valve cuts off communication between the cylinder and the drip passage, but on turning the valve so that the low pressure cylinder will communicate with the drip passage, the high pressure valve will be turned so as to form a communication between both ends of the high pressure cylinder and the drip passage, substantially as described.

3. The combination of the valve casing D, the valves E E' therein, a lever for operating said valves, ports in the valves, substantially as described, and passages in the casing, also arranged substantially as described, whereby the valves will act as drip valves and starting valve, substantially as set forth.

4. The combination of the valve casing, with passages $d$ and $e$ therein communicating with the high and low pressure cylinders, the tapered valve, springs adapted to keep the valves to their seats, heads on the small ends of the valves, a lever common to both heads, an enlarged port in the valve E, a narrow port in the valve E', drip ports in each valve and drip passages in the valve casing, substantially as described.

5. The combination of the valve casing, high and low pressure passages therein, tapered valve in each passage, drip passages in the valve casing, ports in said valves, mechanism for turning the valves in unison, so that when the valves are in one position, the ports form communication between both ends of each cylinder, and the drip passage, and when turned in another position, communication between the ends of the low pressure cylinder is cut off by the valve E', while the valve E acts as a starting valve, and when the valves are turned in another position both passages are closed, substantially as described.

In testimony whereof we have signed our names to this specification in the presence of two subscribing witnesses.

SAMUEL M. VAUCLAIN.
KENNETH RUSHTON.

Witnesses:
JAMES G. KEYS,
JAS. H. M. HAYES.